(12) United States Patent
Semeia

(10) Patent No.: US 6,634,378 B2
(45) Date of Patent: Oct. 21, 2003

(54) PRESSURE REDUCING VALVE

(75) Inventor: Roberto Semeia, Cogorno (IT)

(73) Assignee: Scubapro Europe S.r.l., Casarza Ligure (IT)

( * ) Notice: Subject to any disclaimer, the term of this patent is extended or adjusted under 35 U.S.C. 154(b) by 83 days.

(21) Appl. No.: 10/036,523

(22) Filed: Jan. 7, 2002

(65) Prior Publication Data

US 2002/0088495 A1 Jul. 11, 2002

(30) Foreign Application Priority Data

Jan. 11, 2001 (IT) .......................... SV01A0001

(51) Int. Cl.⁷ .................... F16K 31/363; G05D 16/10
(52) U.S. Cl. ...................... 137/505.25; 137/505.28; 137/908
(58) Field of Search .............. 137/505, 505.25, 137/505.28, 908

(56) References Cited

U.S. PATENT DOCUMENTS

| | | | |
|---|---|---|---|
| 3,583,433 A | | 6/1971 | Lecocq .................. 137/505.28 |
| 4,484,695 A | * | 11/1984 | Fallon et al. ........... 137/505.25 |
| 4,744,387 A | * | 5/1988 | Otteman ................. 137/505.41 |
| 5,381,825 A | * | 1/1995 | Garraffa ................. 137/505.18 |
| 5,509,407 A | * | 4/1996 | Schuler .................. 128/205.24 |

FOREIGN PATENT DOCUMENTS

EP 0811549 A2 10/1997

* cited by examiner

*Primary Examiner*—Stephen M. Hepperle
(74) *Attorney, Agent, or Firm*—James Creighton Wray; Meera P. Narasimhan

(57) ABSTRACT

The invention relates to a pressure reducing valve having a piston-like plug, and whose output pressure is automatically controlled relative to ambient pressure, particularly for scuba breathing apparatus regulators. According to the invention, an antifriction member (18) is interposed between the pad (13) which forms the valve seat and cooperates with the tubular plug (8) and the threaded stem (17) for adjusting the axial position of the pad (13), which antifriction member is free to rotate and to slide axially and prevents any direct contact between the pad and the adjustment threaded stem (17), thereby preventing the threaded stem from driving the pad along (13) into rotation. The antifriction member may be a disk (18) made of a relatively hard material with an appropriate surface smoothness, such as stainless steel or tungsten or a plastic material known with the trade name DELRIN, or the like.

8 Claims, 1 Drawing Sheet

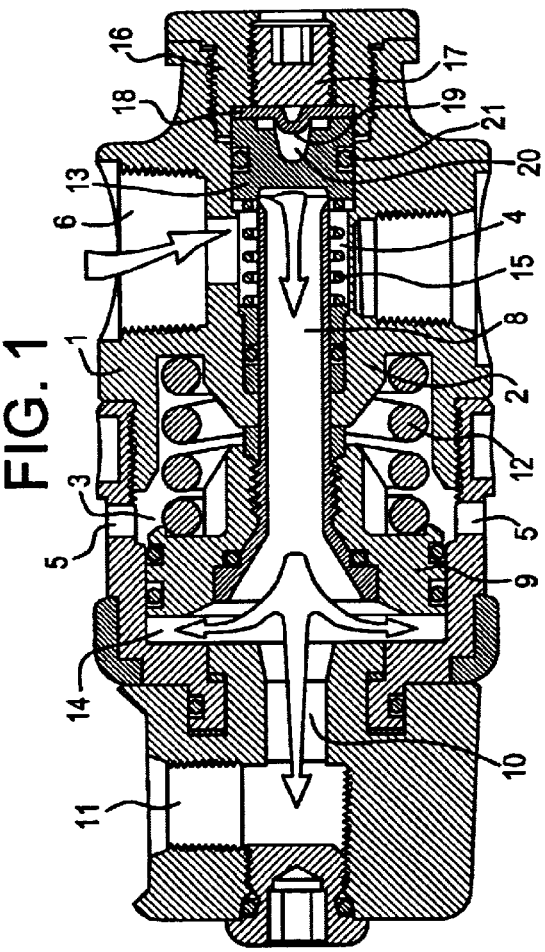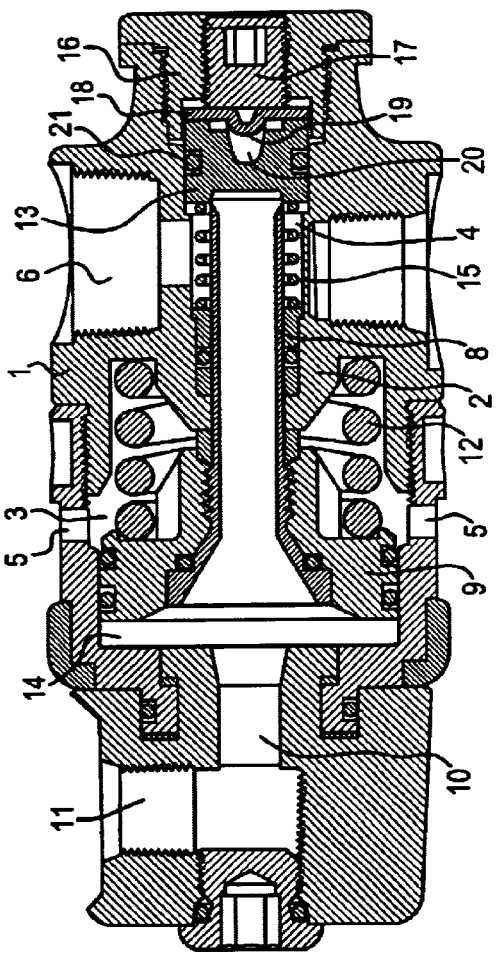

PRESSURE REDUCING VALVE

The invention relates to a pressure reducing valve having a piston-like plug, whose output pressure is automatically controlled relative to ambient pressure, particularly for scuba breathing apparatus regulators.

The valve of the present invention is of the type which comprises two axially adjacent chambers, separated by a partition and whereof one, the so-called compensation chamber, communicates with the outside environment and the other, the so-called pressure chamber, communicates with a pressurized gas source, whereas a tubular plug slidably and tightly passes through the partition, which plug is open at both ends and has a widened piston-like head which is arranged to slide in a tight manner in the compensation chamber, and to separate the latter from an outlet chamber of the valve, in which the respective end of the tubular plug opens, a helical pressure spring being interposed between said piston-like head of the tubular plug and the partition, whereas the other end of the tubular plug cooperates, in the pressure chamber, with a facing pad, which forms the valve seat and is mounted in such a manner as to slide axially for adjustment purposes in a corresponding housing, which pad abuts axially, on the side opposite the plug, against an adjustment screw to be tightened in the valve body or in a part fastened thereto, and preferably consisting of a threaded stem, by which screw the pad may be pushed and displaced axially inwardly, preferably against the force of a helical spring accommodated in the pressure chamber, to adjust the axial position of the pad.

In prior art valves of this type, the pad which forms the valve seat rests against the adjustment screw in direct contact therewith, whereby it is driven along into rotation, due to friction, by the adjustment screw, when the latter is rotated to displace the pad for adjusting its axial position. This forced rotation of the pad is a substantial drawback, particularly if adjustment is performed after using the valve for a certain time. In fact, while the valve is used, the circular edge of the plug, which cooperates with the pad and generally has a thin and even sharp profile, and the surface of the pad cooperating therewith conform to each other and are typically deformed asymmetrically with respect to their axis, for instance due to the imperfect perpendicularity of the plug to the pad surface. As a result, when the pad is rotated by friction along with the adjustment screw upon further adjustment from its axial position, said mutual conformation between the plug edge and the pad surface, achieved while the valve was previously used, is lost, i.e. the deformations on the pad surface are angularly staggered with respect to the corresponding deformations or portions of the plug edge and, for instance, a notch formed in the surface of the pad by a portion of the plug edge is angularly displaced, thereby causing drawbacks known by those skilled in the art, e.g. problems in valve operation, incomplete closure of the valve or whistles and the like.

The invention has the object to obviate this drawback wherefore it provides at least one antifriction member between the pad and the adjustment screw, which is mounted in such a manner as to be free to rotate and slide and is arranged to avoid any direct contact between the end of the adjustment screw and the pad and to prevent the pad from being driven along into rotation by the adjustment screw, when the latter is rotated. By this arrangement, no interference is provided with the possible mutual conformation of the pad and the plug and all drawbacks deriving from angular displacement of the pad relative to the plug are avoided.

Said antifriction member of the invention may be made in any suitable manner. Nevertheless, preferably, according to a particularly simple, inexpensive and effective preferred embodiment of the invention, the antifriction member interposed between the pad and the adjustment screw in such a manner as to be able to rotate and to slide axially, consists of a disk or a flat washer or a toroidal ring, or the like, made of a relatively hard material and having a proper surface smoothness. This antifriction member may be made for instance of stainless steel, titanium, brass or any other suitable metal, or even of a sufficiently hard plastic, such as the plastic known as DELRIN, or the like.

Typically, the diameter of the antifriction member is at least slightly smaller than that of the pad, so that it does not contact the inner walls of the housing of said pad when it is centered with respect to it.

According to a preferred embodiment of the invention, the antifriction member which is interposed between the pad and the adjustment screw in such a manner as to be free to rotate and slide axially, and/or the pad itself have mutual centering means. According to the invention this may be achieved, when the antifriction member is a disk, by providing the antifriction disk, on the side turned toward the pad, with a central centering projection which may have, for instance substantially the shape of a cone or a truncated cone or a spherical cap, or the like, and is engaged in a corresponding central centering recess provided on the side of the pad opposite the plug. Said centering projection of the antifriction disk is engaged in the corresponding centering recess of the pad preferably with a small radial and possibly even axial clearance, which clearance shall not allow the antifriction disk to become decentered with respect to the pad to such an extent as to come to contact with the side walls of the housing of the pad.

According to an additional characteristic of the invention, an O-ring is provided between the pad and its housing, and is accommodated in an annular peripheral groove of the pad or in an inner peripheral groove of the pad housing. This O-ring, besides ensuring tightness between the pad and its housing, also helps—together with the antifriction member interposed between the pad and the adjustment screw—to prevent any rotation of the pad driven along by the adjustment screw, by compensating for any rotation movement transmitted by the antifriction member on the pad thanks to the retaining friction it exerts on the pad itself.

The particular characteristics of the invention and the advantages derived therefrom will appear in further detail from the following description of a preferred embodiment, which is shown by way of non-limiting example in the annexed drawing, in which:

FIGS. 1 and 2 are longitudinal sectional views of a pressure reducing valve according to the invention, the pad which forms the valve seat being shown in two different axial positions.

The pressure reducing valve as shown in the drawing and provided by the invention ensures a reduction of the output pressure which is automatically controlled relative to ambient pressure and forms the pressure reducing valve of the first stage of scuba breathing apparatus regulators. This pressure reducing valve includes a body 1 divided by a partition 2 into two separate and axially adjacent chambers 3 and 4. The chamber 3 is the so-called compensation chamber and communicates through one or more lateral apertures 5 with the outside environment. The chamber 4 is the so-called pressure chamber and is connected through a lateral hole 7 and a fitting 6 in a well-known manner to a pressurized gas (e.g. oxygen or air) bottle.

A tubular plug 8, whose ends are both open, passes in an axially and tightly slidable manner through the partition 2. The tubular plug 8 has a widened head 9 at the end projecting into the compensation chamber 3, which is made in the form of a piston and is tightly slidable in the body 1 of the valve, separating thereby the compensation chamber 3 from an outlet chamber 14, in which the corresponding end of the tubular plug 8 opens, and which is connected through a hole 10 and a fitting 11 to the scuba breathing apparatus. A helical pressure spring is provided between the piston-like head 9 of the tubular plug 8 and the partition 2.

The other end of the tubular plug 8, that projects into the pressure chamber 4, cooperates by the circular edge of its opening with a pad 13 which forms the valve seat. The surface of the pad 13, turned toward the tubular plug 8 and cooperating therewith, preferably has a central recess having a conical, tapering, hemispherical or similar shape, whereas the corresponding edge of the opening of the tubular plug 8 is preferably sharp as a knife blade. A helical pressure spring 15 is provided in the pressure chamber 4 between the partition 2 and the pad 13.

The pad 13 has a circular cylindrical shape and is mounted in such a manner as to slide axially in the direction of the longitudinal axis of the tubular plug 8, as well as to rotate about said axis in a corresponding cylindrical housing provided in the valve body 1. In the illustrated embodiment, the housing for the pad 13 consists at least partly of a cylindrical hole formed in the valve body 1 and sealed from the outside by a threaded stopper 16. A threaded adjustment stem 17, coaxial to the pad 13, is screwed into this stopper 16. The axial position of the pad 13 is adjusted by this threaded stem, which pushes it into its housing toward the tubular plug 8 against the force of the spring 15, thereby moving it from a starting position, as shown in FIG. 1 to a final position, as shown in FIG. 2, in which the pad 13 preferably adheres against a fixed stop.

In order to prevent the threaded stem 17, rotated to adjust the position of the pad 13, from driving along the pad 13 into rotation and to avoid the angular offset of the mutual conformation deformations formed in the pad 13 and/or in the edge of the tubular plug 8 cooperating therewith while the valve was previously operated, an antifriction member 18 is interposed, according to the invention, between the pad 13 and the threaded adjustment stem 17. In the illustrated embodiment, this antifriction member 18 of the invention consists of a disk made of a relatively hard material and having a proper surface smoothness, and is particularly made of stainless steel or titanium or any other suitable metal or of the plastic material known with the trade name of DELRIN, or the like.

The antifriction disk 18 prevents any direct contact between the pad 13 and the threaded adjustment stem 17 and is mounted in such a manner as to be free to rotate and slide axially in the cylindrical housing of the pad 13.

The diameter of said antifriction disk 18 is at least slightly smaller than that of the pad 13, so that when it is centered with respect to the pad 13, its periphery does not contact the walls of the housing of the pad 13.

Preferably, the antifriction disk 18 has a central centering projection 19, which preferably consists of a small conical, tapering, hemispherical or similarly shaped protuberance, and engages in a corresponding centering recess provided on the side of the pad 13 opposite the tubular plug 8. The shape and size of the centering projection 19 and of the centering recess 20 are preferably selected in such a manner as to provide such a clearance therebetween, that the centering projection 19 does not contact the pad 13 or only contacts it in very small portions thereof when the antifriction disk 18 is in the perfectly centered position with respect to the pad 13. The centering pair composed of the projection 19 and the corresponding recess 20 anyway ensures such a median position of the antifriction disk 18 as to prevent its lateral contact with the inner walls of the housing of the pad 13, thereby preventing the antifriction disk 18 from being jammed, i.e. ensuring it can rotate freely.

An O-ring 21 is provided between the inner cylindrical wall of the housing of the pad 13 and the pad 13, and is mounted in an annular outer groove of the pad 13.

Obviously, the invention is not limited to the embodiment described and illustrated herein, but may be greatly varied and modified, particularly within the range of mechanical and functional equivalents. For example, in addition to the materials of the antifriction member interposed between the pad 13 and the threaded adjustment stem 17, the shape and size of this antifriction member may be also changed, said member consisting, for example, of a flat washer or the like, or there being provided, instead of a single antifriction member, a pack of two or more coaxially superposed antifriction members, and the other parts of the pressure reducing valve may be also widely changed.

What is claimed is:

1. A pressure reducing valve, whose output pressure is automatically controlled relative to ambient pressure, particularly for scuba breathing apparatus regulators, comprising two axially adjacent chambers (3, 4), separated by a partition (2), whereof one, the so-called compensation chamber (3), communicates with the outside environment and the other, the so-called pressure chamber (4), communicates with a pressurized gas source, whereas a tubular plug (8) slidably and tightly passes through the partition (2), which plug is open at both ends and has a widened piston-like head (9) which is arranged to slide in a tight manner in the compensation chamber (3), and which separates the latter from an outlet chamber (14) of the valve, in which the respective end of the tubular plug (8) opens, a helical pressure spring (12) being interposed between said piston-like head (9) of the tubular plug (8) and the partition (2), whereas the other end of the tubular plug (8) cooperates, in the pressure chamber (4), with a facing pad (13), which forms the valve seat and is mounted in such a manner as to slide axially for adjustment purposes in a corresponding housing, which pad (13) abuts axially, on the side opposite the plug (8), against an adjustment screw (17) to be tightened in the valve body (1) or in a part (16) fastened thereto, and preferably consisting of a threaded stem, by which screw (17) the pad (13) may be pushed and displaced axially inwardly, preferably against the force of a helical spring (15) accommodated in the pressure chamber (4), to adjust the axial position of the pad (13), characterized in that an antifriction member (18) is interposed between the pad (13) and the threaded stem (17), which is mounted in such a manner as to be free to rotate and to slide axially and to prevent any direct contact between the end of the adjustment screw (17) and the pad (13), and to further prevent the pad (13) from being driven along into rotation by the adjustment screw (17) when the latter is rotated.

2. A valve as claimed in claim 1, characterized in that the antifriction member (18) interposed between the pad (13) and the adjustment screw (17) consists of a disk or a flat washer or a toroidal ring, or the like, made of a relatively hard material and having a proper surface smoothness.

3. A valve as claimed in claim 1 or 2, characterized in that the antifriction member (18) is made of stainless steel or titanium or another metal, or of a plastic material known with the trade name DELRIN, or the like.

4. A valve as claimed in one or more of the preceding claims, characterized in that the diameter of the antifriction member (18) is at least slightly smaller than that of the pad (13), so that it does not contact the inner walls of the housing of said pad (13) when it is centered with respect to it.

5. A valve as claimed in one or more of the preceding claims, characterized in that the antifriction member (18) and/or the pad (13) have means (19, 20) for mutual centering.

6. A valve as claimed in claim 5, characterized in that, when the antifriction member (18) is a disk, it has, on the side turned toward the pad (13), with a central centering projection (19) which may have, for instance substantially the shape of a cone or a truncated cone or a spherical cap, or the like, and is engaged in a corresponding central centering recess (20) provided on the side of the pad (13) opposite the plug.

7. A valve as claimed in claim 6, characterized in that the centering projection (19) of the antifriction disk (18) is engaged in the corresponding centering recess (20) of the pad (13) with a small radial and possibly even axial clearance, which clearance shall not allow the antifriction disk (18) to become decentered with respect to the pad (13) to such an extent as to come to contact with the side walls of the housing of the pad (13).

8. A valve as claimed in one or more of the preceding claims, characterized in that an O-ring (21) is interposed between the pad (13) and its housing, and is accommodated in an annular outer groove of the pad (13) or in an inner peripheral groove of the pad housing.

* * * * *